United States Patent
Chin et al.

(10) Patent No.: US 8,970,459 B2
(45) Date of Patent: Mar. 3, 2015

(54) SYSTEM AND METHOD FOR TIMING COLOR PRESENTATION OF AN IMAGE DISPLAY SYSTEM

(75) Inventors: Kevin M. Chin, Allen, TX (US); Gregory J. Hewlett, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 2415 days.

(21) Appl. No.: 11/647,699

(22) Filed: Dec. 29, 2006

(65) Prior Publication Data

US 2008/0158116 A1    Jul. 3, 2008

(51) Int. Cl.
*G09G 3/34* (2006.01)
*H04N 9/31* (2006.01)

(52) U.S. Cl.
CPC .......... *H04N 9/3197* (2013.01); *H04N 9/3114* (2013.01); *H04N 9/3155* (2013.01)
USPC .................. 345/84; 345/32; 345/88; 345/102

(58) Field of Classification Search
USPC .............. 345/32, 33, 39, 102, 82–84, 88–89; 348/743, 771, 742, 268, 269, 739
See application file for complete search history.

(56) References Cited

U.S. PATENT DOCUMENTS

| | | | | |
|---|---|---|---|---|
| 5,774,196 A | * | 6/1998 | Marshall | 348/743 |
| 6,771,325 B1 | * | 8/2004 | Dewald et al. | 348/743 |
| 6,967,759 B2 | | 11/2005 | Hewlett et al. | 359/242 |
| 7,046,221 B1 | * | 5/2006 | Malzbender | 345/82 |
| 2005/0280745 A1 | * | 12/2005 | Takeda et al. | 348/771 |
| 2006/0098170 A1 | * | 5/2006 | Lin | 353/84 |
| 2008/0198179 A1 | * | 8/2008 | Doser | 345/690 |

OTHER PUBLICATIONS

Hewlett, Gregory J. et al., "Spoke Synchronization System and Method for an Image Display System", filed Oct. 30, 2006, 29 pages, Oct. 30, 2006.

* cited by examiner

*Primary Examiner* — Jennifer Nguyen
(74) *Attorney, Agent, or Firm* — Jacqueline J. Garner; Frederick J. Telecky, Jr.

(57) ABSTRACT

In accordance with the teachings of the present disclosure, a method and system for the timing color of an image display are provided. In one embodiment, a method for displaying image includes sequentially illuminating a spatial light modulator with a plurality of colors by shining light through a color wheel having a plurality of adjacent color segments. The method further includes determining, a time period in which the output of the color wheel is deemed not to correspond solely to either of the two adjacent color segments for at least a portion of the spatial light modulator. The time period is based at least in part on the luminance difference between two adjacent color segments in the color wheel.

20 Claims, 2 Drawing Sheets

SYSTEM AND METHOD FOR TIMING COLOR PRESENTATION OF AN IMAGE DISPLAY SYSTEM

TECHNICAL FIELD

This disclosure relates to display systems, and more particularly, to a system and method for timing color presentation of an image display system.

BACKGROUND

Light modulators are a class of devices that may be used to modulate a source light beam into an image suitable for display on a surface. These light modulators may each have a number of spatially oriented refractive, diffractive, absorptive, or reflective elements that are arranged in a two-dimensional configuration. Examples of such light modulators may include liquid crystal displays, interferometric modulators or deformable micromirror devices (DMDs), sometimes known as digital micromirror devices. To produce the color image, a color filter may be implemented that alternatively filters the source light beam such that differing colors of the source light beam may be periodically directed to the light modulator.

SUMMARY OF THE EXAMPLE EMBODIMENTS

In accordance with the teachings of the present disclosure, a method and system for the timing color of an image display are provided. In one embodiment, a method for displaying image includes sequentially illuminating a spatial light modulator with a plurality of colors by shining light through a color wheel having a plurality of adjacent color segments. The method further includes determining, a time period in which the output of the color wheel is deemed not to correspond solely to either of the two adjacent color segments for at least a portion of the spatial light modulator. The time period is based at least in part on the luminance difference between two adjacent color segments in the color wheel.

Depending on the specific features implemented, particular embodiments of the present disclosure may exhibit some, none, or all of the following technical advantages. Various embodiments may be capable of providing a method of increasing the amount of light from the source light beam to be used by the light modulator. In this manner, a corresponding lesser amount of light is wasted by the system, thus making the image display system relatively more efficient. Additionally, a relatively brighter image may be created by the image display system. Other technical advantages will be readily apparent to one skilled in the art from the following figures, description and claims.

BRIEF DESCRIPTION OF THE DRAWINGS

A more complete understanding of embodiments of the disclosure will be apparent from the detailed description taken in conjunction with the accompanying drawings in which.

DESCRIPTION OF EXAMPLE EMBODIMENTS

In accordance with the teachings of the present disclosure, a method and system for timing the color presentation of an image, display are provided. Generally, particular embodiments of the present disclosure provide colored light to a light modulator in main intervals and spoke intervals. In particular embodiments, the duration, start, and stop time of these intervals are based at least partially on the luminance difference between the colored light provided by adjacent segments of a color filter. Although particular embodiments are described herein in the context of a deformable micromirror device (DMD) and associated color wheel, the teachings of the present disclosure are also applicable to other spatial light modulators and color filters or colored light sources, and are not limited to DMDs or color wheels.

Figure 1A:
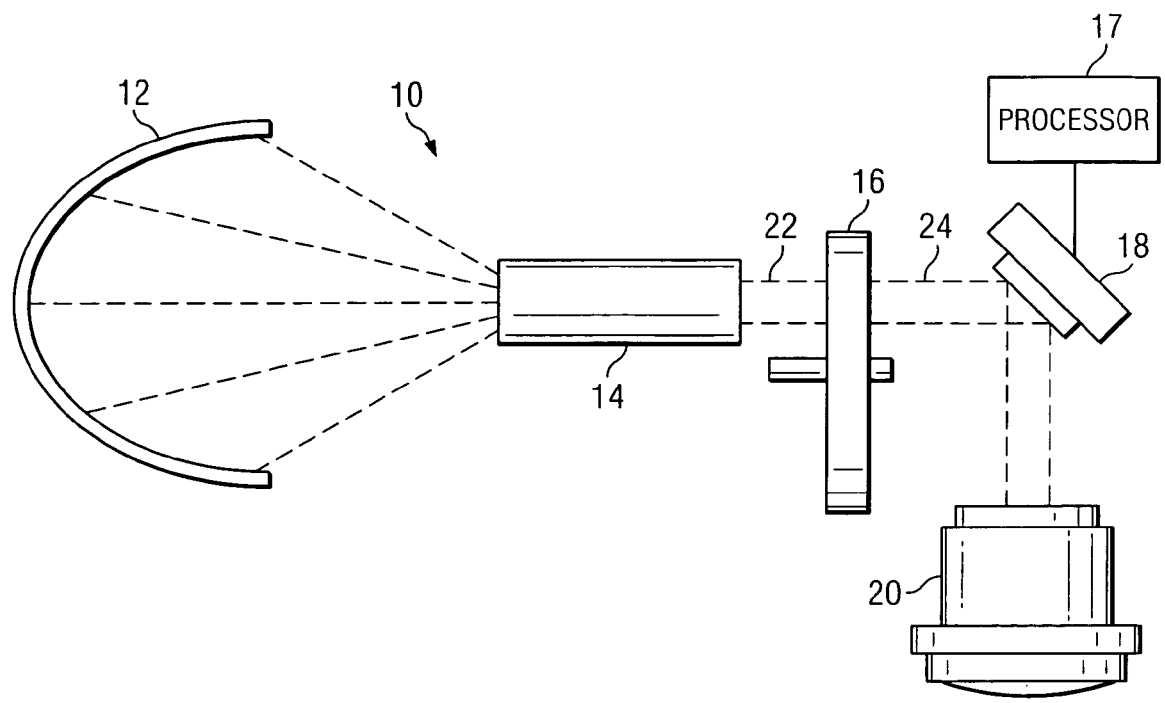
FIG. 1A is a schematic diagram of several components of an image display system that may used to implement various embodiments of the present disclosure.

Referring now to the drawings, FIG. 1A shows a schematic diagram of one embodiment of an image display system 10 according to the teachings of the present disclosure. The image display system 10 generally includes a light source 12, an optional integrator rod 14, a color wheel 16, a processor 17, a light modulator 18, and a projection lens 20. The light source 12 is configured to produce visible light that may be formed into a source light beam 22 by the integrator rod 14. The source light beam 22 is directed through a color wheel 16 for sequentially filtering of the source light beam 22 into a colored light beam 24. The colored light beam 24 is subsequently modulated into a visual image by the light modulator 18 and directed towards the projection lens 20 for display of the image. The processor 17 is operable to provide a signal to light modulator 18 that at least partially controls the timing of the light modulation. In some embodiments, the image may include a number of pixels arranged in N number of rows by M number of columns, thereby forming the image having a height equal to M*(pixel size) and a width equal to N*(pixel size).

In various embodiments, light modulator 18 may be a spatial light modulator, such as, for example, a liquid crystal display, a liquid crystal on silicon display, or an interferometric modulator. In this particular embodiment, however, the light modulator 18 is a deformable micromirror device (DMD), sometimes known as a digital micromirror device.

In this particular embodiment, DMD 18 has a number of reflective elements arranged in an M×N configuration corresponding to the arrangement and quantity of pixels to be displayed in the image. These reflective elements are adapted to selectively reflect the colored light beam 24 through the projection lens 20. When coordinated together, the reflective elements are operable to create an image that is refracted by the projection lens 20 for display upon any suitable planar surface.

The image may include different colors by use of any suitable color filter that is adapted to alternatively transmit selectively filtered light 24 from the source light beam 22. In the embodiment of FIG. 1A, the color filter is a color wheel 16. Color wheel 16 enables the source light beam 22 to be filtered at predetermined time intervals so as to provide field sequential images. Color wheel 16 enables system 10 to generate a rapid sequence of differently colored images that are perceived by a viewer as correctly colored.

Figure 1B:
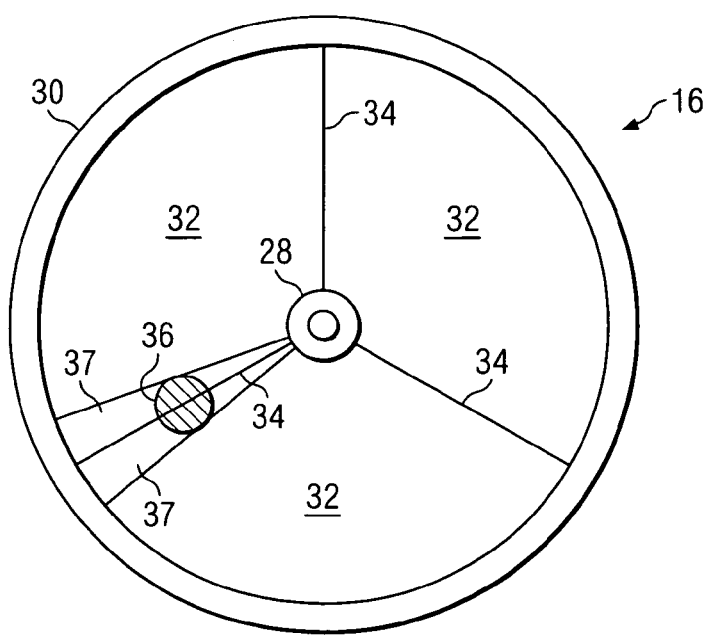
FIG. 1B is one embodiment of a color wheel that may be used with the image display system of FIG. 1A.

FIG. 1B shows one embodiment of the color wheel 16 of FIG. 1A. The color wheel 16 generally includes a hub 28, an outer ring 30, and three generally pie-shaped translucent color filter elements 32; however, any suitable number of color filter elements 32 having any suitable shape may be used. The junction between each of the color filter elements 32 may be referred to as an interface 34. Each color filter element 32 may be operable to filter the source light beam 22 to transmit a respectively colored light beam 22. In addition, some embodiments may include a color filter element 32 operable to transmit substantially all the visible light received. In some such embodiments, the color filter element 32 transmitting substantially all the visible light received may appear clear or "white" in color. In one embodiment, the three color filter elements 32 of color wheel 16 may selectively transmit, for example, red, green, and blue colored light. In another embodiment, the three color filter elements 32 may each selectively transmit, for example, yellow, cyan, and magenta colored light. However, any appropriate combination, arrangement, number, or color of color filter elements 32 may be used.

In operation, the color wheel 16 rotates about hub 28, such that the source light beam 22 alternatively shines through each of the color filter elements 32 and outputs from color wheel 16 as the colored light beam 24. Given a generally constant rotational velocity of the color wheel 16, the colored light beam 24 corresponding to a respective one of color filter elements 32 may be supplied to the light modulator 18 at periodic or "main" intervals. Other periodic intervals associated with each interface 34, or "spoke intervals," are also present during operation. During each spoke interval, the colored light beam 24 is deemed not to correspond solely to one of the color filter elements 32 forming the respective interface 34. In this particular embodiment, processor 17 provides a signal to light modulator 18 that at least partially controls the timing of the main and spoke intervals. In certain embodiments, minimizing the spoke intervals and maximizing the main intervals may more efficiently utilize the light emanating from the light source 12.

Many factors may contribute to main and spoke interval timing. One example factor is the general tolerances of image display system 10, including, for example, the synchronization of the color wheel 16 rotation to light modulator 18. Another example factor is the size of the source light beam's 22 cross-section 36 relative to color wheel 16. As the source light beam 22 shines through color wheel 16 near an interface 34, the colored light beam 24 directed to light modulator 18 may include mixed components from adjacent color filter elements 32. The mixed components generally cannot be used for generating a colored image uniquely corresponding to only one of the color filter elements 32; however, in some embodiments, portions of the mixed components may still be used, during a spoke interval, to increase the color palette of image display system 10. In some embodiments, shrinking spoke timing too far may result in displaying the mixed components during a main interval, thereby "bleeding" colors together.

It has been discovered that the visible artifacts associated with color bleeding may be a function of the luminance difference between adjacent color filter elements 32 and the start and stop times of corresponding main intervals. Luminance as used herein refers to how much luminous power will be perceived by an eye looking at the display surface from a particular angle of view and is thus an indicator of how bright the surface will appear. In this case, the solid angle of interest is the solid angle subtended by the eye's pupil. To illustrate, it has been observed that the visible artifacts from a viewer's perspective are far greater when white light bleeds into blue light than when blue light bleeds into green light.

Accordingly, teaching of some embodiments of the present disclosure recognize that designing color wheels 16 and the timing of associated spoke intervals, based at least partially on the luminance differences between adjoining color filter elements 32, may minimize or eliminate visible artifacts associated with color bleeding while enhancing main interval timings; however, other factors besides luminance can be used. For example, the timing of main and spoke intervals in various embodiments may be determined at least partially as a function of color components, such as DE (CIE 1994) or CIE 1976 L*a*b*.

In some embodiments, the timing of some spoke intervals may be asymmetric relative to respective interfaces 34, or not "centered." Asymmetric spoke timing may be explained with reference to conventional designs. Conventionally, the midpoint of each spoke interval, defined herein as the moment in time halfway between the start and stop time, is typically centered or coincident with the moment an interface 34 bisects the cross-section 36 of light source beam 22. The midpoints of asymmetric spokes intervals, however, are not coincident or centered. In some embodiments of the present disclosure, asymmetric spoke timing may allow the expansion of main interval timing closer to the threshold of color bleeding.

In certain embodiments, it would be desirable for the image display system 10 to efficiently utilize the light emanating from the light source 12. That is, an incremental increase in the usage of the light available from the light source 12 may yield a corresponding incremental increase in overall brightness of the resulting image. With a relatively higher brightness, usage of the image display system 10 may be enabled in environments having higher ambient light levels. A relatively higher overall brightness may also reveal details of the image that may not be as ascertainable with a lower overall brightness level. Thus, according to the teachings of the present disclosure, a system and method is provided for optimizing the timing of main and spoke intervals.

Figure 2:
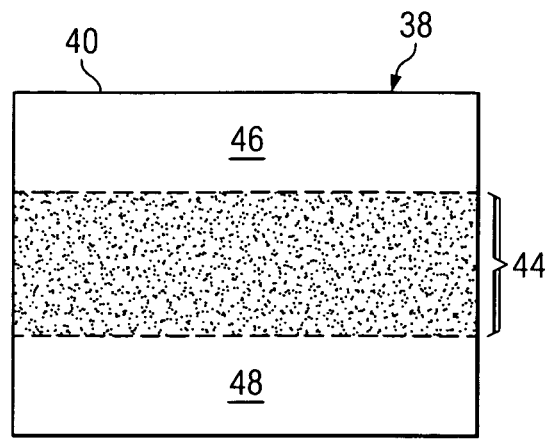
FIG. 2 is an illustrative view of an image produced by the image display system of FIG. 1 showing a theoretical spoke region of the image.

FIG. 2 is one embodiment of a two-dimensional image 40 that may be displayed upon a display 38. Movement of the interface 34 through the source light beam 22 creates a corresponding theoretical spoke region 44 that extends horizontally across the image 40. This spoke region 44 is a design constraint that may be used to synchronize the operation of the image display system 10 with the movement of the spoke region 44. A design constraint generally refers to a prescribed limitation that may be placed upon any functional component of the image display system 10. In this particular embodiment, the spoke region 44 specifies a region in which each pixel of the light modulator 18 should be turned off at least when any portion of the spoke region 44 is coincidental with that particular pixel; however, other embodiments may alternatively turn on pixels coincident with at least a portion of the spoke region 44. In this particular embodiment, interface 34 has a generally horizontal orientation relative to the image 40. It should be appreciated, however, that the position of the color wheel 16 relative to the source light beam 22 may cause the spoke region 44 to have any orientation relative to the image 40, such as, for example, a vertical orientation. It may be undesirable to use the portion of the source light beam 22 in this spoke region 44 because its generally low quality of light may impair the quality of the resulting image. Thus, it may be beneficial to momentarily reset or turn off particular pixels of the light modulator 18 within the spoke region 44.

Above the spoke region 44 is one colorized portion 46 of the source light beam 22, associated with a main interval, which may present usable light for the image display system 10. Below the spoke region 44 is another colorized portion 48 of the source light beam 22 that may present usable light for the image display system 10. It may be important to note that FIG. 2 depicts an instantaneous view of the colorized portions 46 and 48 and mixed-color region 44. In operation, an interface 34 progresses across the source light beam 22 at a predetermined rate determined by the angular speed of rotation of the color wheel 16, thereby producing a moving spoke region 44. Accordingly, some embodiments of the present disclosure enable usage of the colorized portions 46 and 48 as the spoke region 44 progresses across the image 40. That is, in some such embodiments, main intervals may apply to distinct regions of light modulator 18 at the same moment a spoke interval may apply to other regions. Thus, in some such embodiments, each main and spoke interval may include multiple phases that track the movement of the spoke region 44 across the image 40, each phase applied to a particular region of modulator 18.

Figure 3:
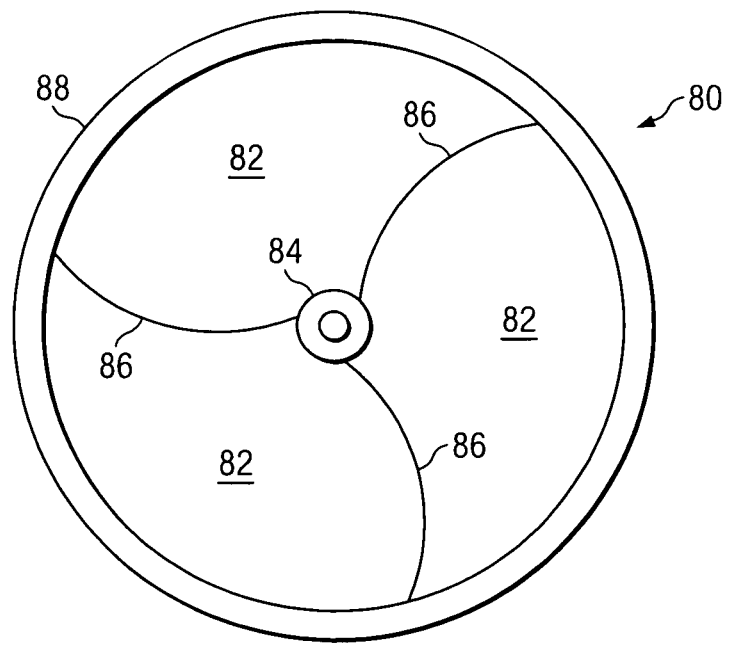
FIG. 3 is an alternative embodiment of a color wheel that may be used with the image display system of FIG. 1A.

FIG. 3 shows an alternate embodiment of a color wheel 80 that may be used with the image display system 10 of the present disclosure. The color wheel 80 is generally disk-shaped having three translucent color filter elements 82 that are radially disposed about a hub 84 in a similar manner to the color wheel 16 of FIG. 1B. The color wheel 80 also has an outer ring 88 that extends around the outer periphery of the color wheel 80 in a similar manner to color wheel 16. However, the interfaces 86 of the color wheel 80 differ from the interfaces 34 of color wheel 16 in that the interfaces 86 are each generally arcuate in shape. In some embodiments, this arcuate shape may serve the purpose of further reducing spoke time by minimizing error associated with the radial motion of the color wheel.

Thus, it may be seen that the arcuate shape of the interfaces 86 used in conjunction with optimized timing of main and spoke intervals may serve to enhance the efficiency of light provided to light modulator 18.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as falling within the spirit and scope of the appended claims.

What is claimed is:

1. A method for controlling light comprising:
   rotating a color wheel through a source light beam, the color wheel having at least three adjacent color filter elements that each form a corresponding interface with an adjacent color filter element;
   determining, based at least in part on the luminance difference between each pair of the color filter elements that form an interface, a plurality of time periods in which the color of the color wheel output is deemed to correspond to respective ones and only ones of the at least three color filter elements; and
   providing each colored light during the determined time periods.

2. The method of claim 1, wherein each of the interfaces is generally linear in shape.

3. The method of claim 1, wherein each of the interfaces is generally arcuate in shape.

4. The method of claim 1, wherein each of the at least three color filter elements selectively transmits a color that is selected from the group consisting of red, green, blue, yellow, magenta, cyan, and white.

5. A method for displaying an image comprising:
   sequentially illuminating a spatial light modulator with a plurality of colors by shining light through a color wheel having a plurality of adjacent color segments; and
   determining, based at least in part on the luminance difference between two adjacent color segments in the color wheel, a time period in which the output of the color wheel is deemed not to correspond solely to either of the two adjacent color segments for at least a portion of the spatial light modulator.

6. The method of claim 5, wherein sequentially illuminating comprises rotating the color wheel through a source light beam.

7. The method of claim 6, and further comprising providing an interface between the two adjacent color segments in the color wheel that is generally linear in shape.

8. The method of claim 6, and further comprising providing an interface between the two adjacent color segments in the color wheel that is generally arcuate in shape.

9. The method of claim 5, wherein each of the plurality of color segments selectively transmits a color that is selected from the group consisting of red, green, blue, yellow, magenta, cyan, and white.

10. The method of claim 5, and further comprising displaying an image by spatially modulating the colored illumination provided to the spatial light modulator.

11. The method of claim 10, wherein displaying an image further comprises displaying an image during at least a portion of the time period.

12. The method of claim 11, wherein at least a portion of the displayed image has a color resulting from shining light simultaneously through the two adjacent color segments.

13. The method of claim 10, wherein displaying an image further comprises displaying an image outside of the time period.

14. The method of claim 5, wherein sequentially illuminating a spatial light modulator comprises sequentially illuminating a deformable micromirror device.

15. The method of claim 5, and further comprising shining light through one of the two adjacent color segments longer than the other of the two adjacent color segments during the time period.

16. The method of claim 5, and further comprising shining light through the two adjacent color segments about an equivalent amount of time during the time period.

17. A system for displaying an image comprising:
   a processor that is operable to generate a signal comprising a plurality of time intervals based at least in part on the luminance difference between at least two colored beams of light of a plurality of colored beams of light; and
   a light modulator operable to spatially modulate the plurality of colored beams of light at least partially in response to the signal.

18. The system of claim 17, and further comprising:
   a light source operable to generate a light beam; and
   a color filter having a plurality of color segments, the color filter being configured to move through the light beam to produce the plurality of colored beams of light.

19. The system of claim 18, wherein the plurality of time intervals comprise a plurality of main intervals in which the output of the color filter is deemed to correspond to respective ones and only ones of the plurality of color segments for at least a portion of the light modulator.

20. The system of claim 17, wherein the plurality of the colored beams of light have a color that is selected from the group consisting of red, green, blue, yellow, magenta, cyan, and white.

* * * * *